L. BECK.
ADJUSTABLE AXLE NUT.
APPLICATION FILED MAY 5, 1911.
1,015,124.
Patented Jan. 16, 1912.
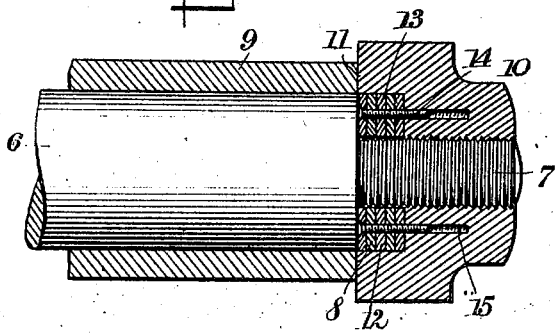
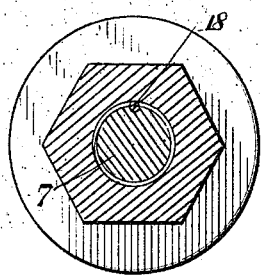
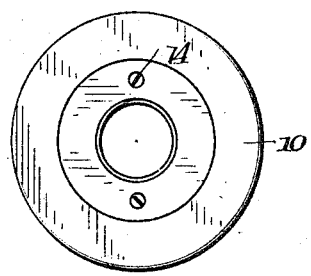
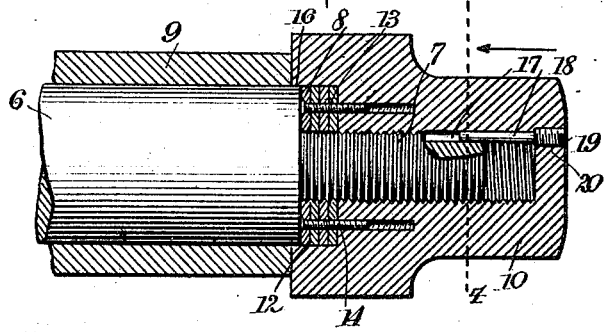
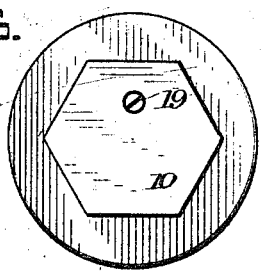
WITNESSES
INVENTOR
Larkin Beck
BY
ATTORNEYS

UNITED STATES PATENT OFFICE.

LARKIN BECK, OF KIRTLAND, TERRITORY OF NEW MEXICO.

ADJUSTABLE AXLE-NUT.

1,015,124. Specification of Letters Patent. Patented Jan. 16, 1912.

Application filed May 5, 1911. Serial No. 625,189.

*To all whom it may concern:*

Be it known that I, LARKIN BECK, a citizen of the United States, and a resident of Kirtland, in the county of San Juan and Territory of New Mexico, have invented a new and Improved Adjustable Axle-Nut, of which the following is a full, clear, and exact description.

My invention relates to a new and improved form of axle nut.

An object of my invention is to provide an axle nut which may be progressively fed on to the axle as the latter wears away, in order to take up end play.

A further object of my invention is to provide a lock nut which may be adjustably positioned on the axle, and which may be locked in such position.

A further object of my invention is to provide washers in the nut, which washers may be removed when desired.

I attain the above-outlined objects by disposing within a nut, a series of washers bearing against the end of the axle, which washers may be removed when wear occurs, and by making the pitch of the threads of the axle equal to the thickness of these washer members, the locking groove and pin will always be brought into alinement.

With the above and other objects in view, as will more fully hereinafter appear, the present invention consists in certain novel details of construction and arrangement of parts hereinafter fully described, illustrated in the accompanying drawings, and more particularly pointed out in the appended claim.

Reference is to be had to the accompanying drawings, forming a part of this specification, in which similar characters of reference indicate corresponding parts in all the figures, and in which—

Figure 1 is a transverse sectional view taken through a preferred embodiment of my invention; Fig. 2 is a side elevation of the inside of the nut, said nut being dismounted from the axle; Fig. 3 is a view similar to Fig. 1, showing a modified form of nut; Fig. 4 is a transverse sectional view taken on the line 4—4 of Fig. 3 and looking in the direction of the arrow; and Fig. 5 is an outside end elevation of the nut shown in Fig. 3.

Described more in detail, I have shown a shaft 6 of any common construction, projecting from one end of which is a threaded portion 7, which portion forms with the end of the shaft 6, a shoulder 8. Surrounding the shaft 6 is any preferred form of boxing 9. Mounted upon the portion 7 and in screw-threaded engagement therewith, is a nut 10, which nut is preferably of a diameter slightly greater than the diameter of the boxing 9, so as to form a flat inner bearing surface 11 adapted to fit flush against the end of the boxing 9.

Concentric with the portion 7, the inner bearing surface 11 is countersunk, as shown at 12, which countersunk portion has a diameter equal to the diameter of the shaft 6. Disposed in the countersunk portion 12, surrounding the portion 7 and bearing against the shoulder 8 and the shaft 6, is a series of washers 13, preferably of metal, which washers are held in place by a series of screw-threaded pins 14 passing through the washers and each of said pins engaging in a screw-threaded aperture 15 extending from the bottom of the countersunk portion 12 down into the body of the nut 10 a distance at least as great as the thickness of the combined series of washers. It will be seen that by this arrangement as washer after washer is taken off and the pins 14 reinserted into the apertures 15, the pins will be free to move into the apertures, so that the heads of the pins will be flush with the outer surface of the outermost washer or ring, which will permit the nut 10 to ride on to the axle 6, as shown at 16 in Fig. 3, as the boxing 9 wears away. This will always keep the nut in close contact with the boxing 9 and will keep the shoulder 8 in firm contact with the nut 10.

In numerous instances, as, for instance, automobile construction, it is desirable to lock the nut to the axle, in which case one side of the threaded portion 7 is longitudinally grooved, as shown at 17, in which groove is inserted the shank 18 of a screw-thread headed pin 19, which pin is in screw-threaded engagement with a threaded aperture 20 extending through the end of the nut 10.

The pitch of the threads on the portion 7 is equal to the thickness of one of the washers 13, so that in removing a washer and screwing the nut 10 up on the portion 7, the groove 17 and shank 18 will be brought into alinement, irrespective of the number of washers removed. This will always afford a tight, firm connection between the several members.

Many changes could be made in the above construction and many apparently widely different embodiments of this invention could be made without departing from the scope thereof. It is intended that all matters contained herein in the above description or shown in the accompanying drawings, shall be interpreted as illustrative and not in a limiting sense. It is also to be understood that the language used in the following claim is merely intended to cover all the generic and specific features of the invention herein described, and all statements of the scope of the invention, which, as a matter of language, might be said to fall therebetween, and that materials, sizes and relativities of parts are non-essential, except as called for in the claim.

Having thus described my invention, I claim as new and desire to secure by Letters Patent:

In combination, an axle having a screw-threaded portion extending from one end thereof, a nut in screw-threaded engagement with said portion, said nut having a countersunk portion adjacent said axle, a series of washers disposed in said countersunk portion, bearing against the end of said axle, the pitch of the threads on said portion being equal to the thickness of each of said washers, said portion having a longitudinal slot in the side thereof adjacent its outer end, and a pin carried by said nut engaging said slot, whereby as the washers are removed in succession, one rotation of the nut on the portion will bring said pin and slot in alinement to lock the nut in position.

In testimony whereof I have signed my name to this specification in the presence of two subscribing witnesses.

LARKIN BECK.

Witnesses:
H. B. SAMMONS,
J. H. GRAHAM.